United States Patent
Cairns et al.

(10) Patent No.: US 8,149,929 B2
(45) Date of Patent: Apr. 3, 2012

(54) RECEIVER AND METHOD FOR PROCESSING RADIO SIGNALS USING SOFT PILOT SYMBOLS

(75) Inventors: Douglas Cairns, Durham, NC (US); Elias Jonsson, Malmo (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 814 days.

(21) Appl. No.: 12/239,918

(22) Filed: Sep. 29, 2008

(65) Prior Publication Data

US 2009/0310715 A1 Dec. 17, 2009

Related U.S. Application Data

(60) Provisional application No. 61/073,264, filed on Jun. 17, 2008.

(51) Int. Cl.
*H04L 27/00* (2006.01)
(52) U.S. Cl. ........ 375/259; 375/260; 375/267; 375/340; 375/341; 375/346; 375/348; 375/324
(58) Field of Classification Search .................. 375/259, 375/320, 340, 260, 267, 341, 346, 348, 324; 370/203, 205, 206, 208, 209, 210
See application file for complete search history.

(56) References Cited

U.S. PATENT DOCUMENTS

| | | | |
|---|---|---|---|
| 5,265,128 A | 11/1993 | Widmer et al. | |
| 6,987,797 B2 * | 1/2006 | Fernandez-Corbaton et al. | 375/148 |
| 7,450,604 B2 * | 11/2008 | Gardner et al. | 370/436 |
| 7,574,214 B2 * | 8/2009 | Perets et al. | 455/450 |
| 7,668,246 B2 * | 2/2010 | Zhidkov et al. | 375/260 |
| 7,684,473 B2 * | 3/2010 | Walton et al. | 375/150 |
| 7,957,483 B2 * | 6/2011 | Yu et al. | 375/267 |
| 2003/0072395 A1 | 4/2003 | Jia et al. | |
| 2008/0139237 A1 | 6/2008 | Papasakellariou | |
| 2008/0267156 A1 * | 10/2008 | Gubeskys et al. | 370/342 |
| 2009/0046787 A1 * | 2/2009 | Uesugi et al. | 375/260 |
| 2009/0132889 A1 * | 5/2009 | Radke | 714/763 |

FOREIGN PATENT DOCUMENTS

WO WO 2006/077729 * 7/2006
WO WO 2007/112489 A1 10/2007

* cited by examiner

Primary Examiner — Dhaval Patel

(57) ABSTRACT

A receiver and method for receiving and processing a sequence of transmitted symbols in a digital communication system utilizing soft pilot symbols. A set of soft pilot symbols are transmitted with higher reliability than the remaining symbols in the sequence by modulating the soft pilot symbols with a lower order modulation such as BPSK or QPSK while modulating the remaining symbols with a higher order modulation such as 16QAM or 64QAM. The receiver knows the modulation type and location (time/frequency/code) of the soft pilot symbols, and demodulates them first. The receiver uses the demodulated soft pilot symbols as known symbols to estimate parameters of the received radio signal. Unlike traditional fixed pilots, the soft pilots still carry some data. Additionally, the soft pilots are particularly helpful in establishing the amplitude reference essential in demodulating the higher order modulation symbols.

2 Claims, 10 Drawing Sheets

RECEIVER AND METHOD FOR PROCESSING RADIO SIGNALS USING SOFT PILOT SYMBOLS

CROSS-REFERENCE TO RELATED APPLICATIONS

This application claims the benefit of U.S. Provisional Application No. 61/073,264 filed Jun. 17, 2008, the disclosure of which is incorporated herein by reference in its entirety.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to digital radio communication systems. More particularly, and not by way of limitation, the present invention is directed to a receiver and method for receiving and processing a sequence of transmitted symbols in a digital communication system utilizing soft pilot symbols.

In digital communication systems, the receiver must estimate some parameters in order to correctly demodulate the transmitted data. The receiver may also need to estimate a measure of signal quality to feed back to the transmitter. The estimation of parameters/signal quality generally falls into three categories:

(1). Blind estimation. Generally this approach relies on some signal or channel property/characteristic that is known a priori or learned in a slow manner (for example, second-order statistics). The biggest problem with blind estimation is performance. Blind estimation generally underperforms other approaches by a significant margin. Also, blind estimation algorithms may be more complex.

(2). Pilot-aided. This approach includes known (i.e., pilot) symbols in the transmitted signal. Pilot symbols can be embedded in the data sequence (for example, the midamble of GSM) or allocated a separate resource such as the pilot code in WCDMA, so long as the pilot symbols experience the same effective fading channel as the data. The pilot-aided approach generally offers the best performance. However, pilot symbols consume resources that might otherwise be devoted to transmitting useful data. Typically there is a tradeoff between having sufficient pilots for good estimation and maximizing data throughput.

(3). Data-aided. This approach uses demodulated data symbols as "extra" pilot symbols. Generally this approach is used in conjunction with either blind estimation or the pilot-aided approach. There are two problems associated with the data-aided approach. First, blind estimation or pilot-aided estimation (or both) is typically required as a first receiver step. Therefore, data-aided approaches require extra receiver complexity. Second, data-aided approaches can degrade receiver performance due to the effect of errors in demodulating data. In data-aided approaches, the demodulated data symbols are assumed to be correct and are used as additional pilot symbols. However, if the data symbols are incorrect, the parameter/signal quality estimation algorithms can produce incorrect results. The effects of incorrect symbol decision(s) can persist for more than one estimation interval, so data-aided approaches may need special mechanisms to avoid the effect of error propagation.

The data-aided approach has been utilized in a number of existing communication systems. For example, in Wideband Code Division Multiple Access (WCDMA) systems, the control channel on the uplink is demodulated/decoded, and the symbol decisions are used as effective pilots. This has also been proposed for the WCDMA control channel on the downlink. In the Digital Advanced Mobile Phone System (D-AMPS), the channel is first estimated over a synchronization word and then tracked over data during equalization. In the equalizer, early temporary unreliable decisions are fed to the tracker, and delayed better decisions are fed to the decoder. Also in D-AMPS and GSM, multi-pass (turbo) demodulation/decoding uses decoded/re-encoded symbols as effective pilots in a second pass.

SUMMARY

The present invention overcomes the disadvantages of the prior art by transmitting some symbols with higher reliability than others. These so-called "soft pilots" are demodulated first and then used as known symbols for use in channel estimation and demodulation of higher-order modulation symbols (amplitude reference).

Thus, one embodiment of the present invention is directed to a method in a radio receiver for estimating parameters of a received radio signal that includes a sequence of transmitted symbols. The method includes the steps of demodulating symbols transmitted with higher reliability first to form soft pilot symbols; and utilizing the soft pilot symbols as known symbols to estimate parameters of the received radio signal. These soft pilot symbols are more robust than the surrounding symbols, thereby enabling reliable decision-directed parameter estimation. Additionally, inserting a "constant envelope" modulation symbol among higher order modulation symbols is particularly helpful in establishing the amplitude reference essential in demodulating the higher order modulation symbols.

In one embodiment, the soft pilot symbols are modulated with a simpler, lower order modulation (for example, BPSK or QPSK) compared to the rest of the symbol sequence, which is likely a higher order modulation (for example, 16 Quadrature Amplitude Modulation (16QAM) or 64QAM). By using these soft pilots, the symbol can still carry some data, contrasted to a fixed pilot symbol, which allows no data throughput for the symbol. These specified soft symbol locations (time/frequency/code) and the modulation type(s) are known by the receiver. The receiver may know the information a priori or through signaling.

Soft pilots provide an alternative to explicit data pilots for future releases of WCDMA. With soft pilot symbols, explicit pilot symbols are not necessary. With knowledge of the modulation type and the location of the soft pilots in time, frequency, and code, the receiver can maximize performance. This allows for better data rates than would otherwise be possible with explicit pilot symbols.

In a specific embodiment, the invention is implemented in a two-pass Generalized Rake (G-Rake) receiver. The performance of the G-Rake receiver is improved to the point that it performs nearly as well as an ideal receiver. Thus the invention provides the best performance given a linear equalization approach. The two-pass G-Rake receiver includes means for computing a set of approximate combining weights in a first pass; means for identifying a set of soft pilot symbols in the sequence, wherein the soft pilot symbols are modulated with a lower order modulation than the remaining symbols in the sequence; and means for utilizing the approximate combining weights to coherently combine despread values corresponding to the soft pilot symbols to create symbol estimates. The receiver also includes means for resealing the symbol estimates; means for making hard symbol decisions without decoder involvement on the rescaled symbol estimates given the constellation used for transmission; and means for utilizing the hard symbol decisions as demodulation pilots to non-parametrically estimate an impairment covariance matrix. The receiver also includes means for computing a set of refined combining weights in a second pass utilizing the estimated impairment covariance matrix; and means for combining all traffic data utilizing the refined combining weights.

In another embodiment, the present invention is directed to a system comprising a transmitter and a receiver for performing the methods as described in the following detailed description.

BRIEF DESCRIPTION OF THE SEVERAL VIEWS OF THE DRAWING

In the following section, the invention will be described with reference to exemplary embodiments illustrated in the figures, in which.

DETAILED DESCRIPTION

For high data rate communications, higher order modulations such as 16QAM and 64QAM are utilized to increase spectral efficiency. According to a first embodiment of the present invention, the transmitter designates certain symbols in the data sequence as so-called "soft pilot" symbols by using a specific alternative modulation for these symbols. The specific modulation order and the location of these symbols (in terms of time, code, and/or frequency) is known by or signaled to the receiver. The receiver utilizes the soft pilot symbols to obtain an initial estimation of signal parameters such as the channel taps and the correlation matrix. After a first demodulation, decided symbols may be utilized as effective pilots in a second pass of parameter estimation. By limiting the decided soft pilot symbols to a lower modulation than the remaining symbols in the sequence, their decisions are reliable enough to make them useful pilots. The soft pilots are different than traditional fixed pilots in that some data throughput is carried by these soft pilot symbols. Thus, replacing traditional fixed pilots with soft pilots improves data throughput.

Figure 1:
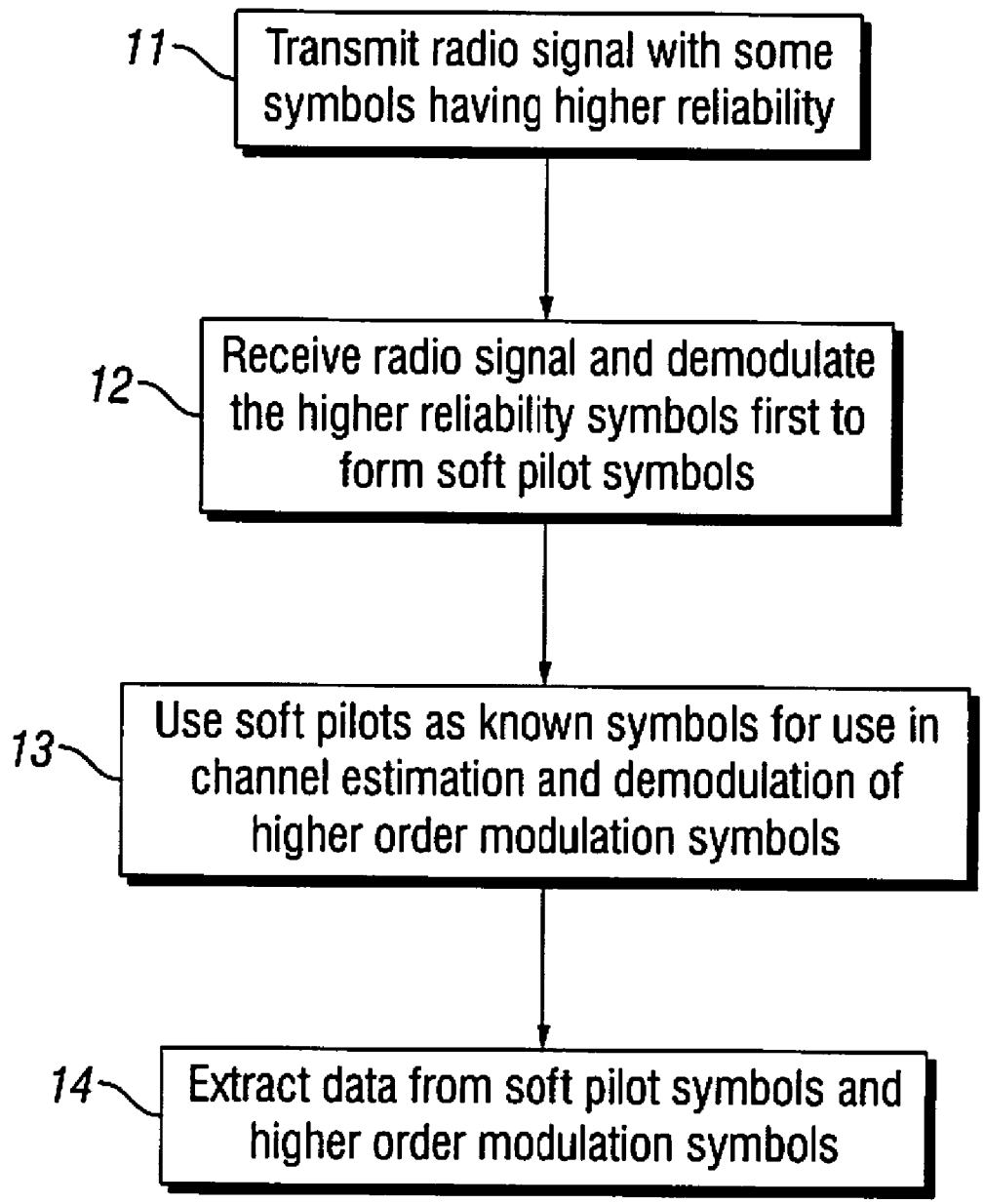
FIG. 1 is a flow chart illustrating the steps of an exemplary embodiment of the method of the present invention.

FIG. 1 is a flow chart illustrating the steps of an exemplary embodiment of the method of the present invention. At step 11, a radio signal is transmitted with some symbols having higher reliability (for example, with a lower order modulation) than other transmitted symbols. At step 12, the radio signal is received and the higher reliability symbols are demodulated first to form soft pilot symbols. At step 13, the soft pilots are utilized as known symbols for channel estimation and demodulation of the higher order modulation symbols. At step 14, data is extracted from both the soft pilot symbols and the higher order modulation symbols.

An exemplary embodiment of the present invention specifies the modulation type and the location (time/frequency/code) of the soft pilot symbols within the data sequence. According to one embodiment of the invention, the constellation points of the soft pilots are taken as a subset of the higher order modulation constellation for the data transmission, such as 16QAM or 64QAM. The transmitter may utilize a specified lower order modulation for the pilot symbols such as Binary Phase Shift Keying (BPSK) or Quadrature Phase Shift Keying (QPSK). For the rest of the symbol sequence, the transmitter may utilize a higher order modulation (for example, 16QAM or 64QAM). These specified soft symbol locations and the modulation type(s) are known by the receiver. The receiver may know the information a priori or through signaling.

Thus the present invention transmits lower order modulation symbols inserted among higher order modulation symbols, and the receiver performs associated actions to exploit the lower order modulation symbols as effective pilots. A symbol can carry a range of number of bits m: m=0 bit corresponds to a pure pilot; m=1 bit corresponds to BPSK; m=2 bits corresponds to QPSK; and so on, up to the maximum number M (=6 for 64QAM). If it is assumed for simplicity that all symbols have the same energy, then the bit energy and the bit reliability decrease with m. Thus, the symbols can be used as pilots of various levels of reliability, and the receiver can perform parameter estimations in multiple passes.

Figure 2:
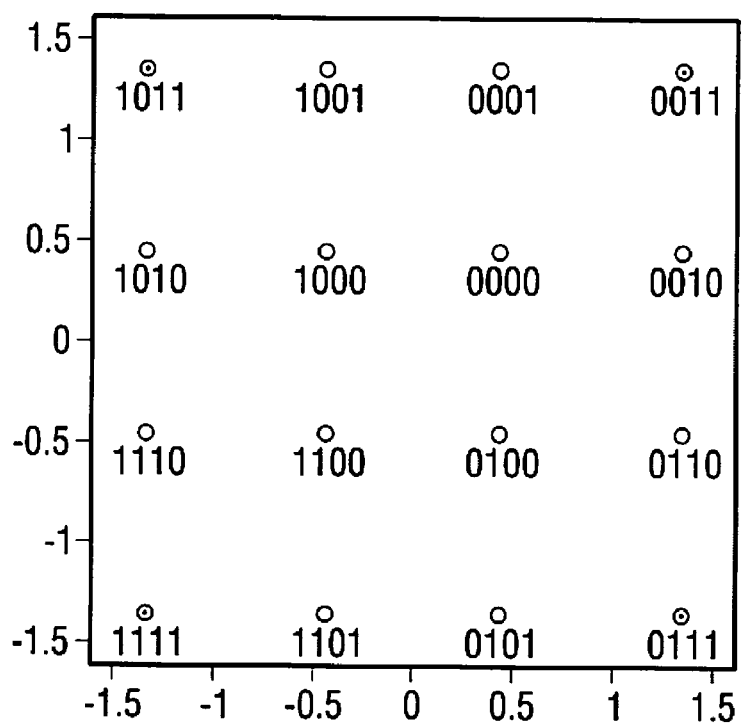
FIG. 2 shows the data bit mapping to points in the constellation for 16QAM in one exemplary embodiment of the present invention.

FIG. 2 shows the data bit mapping to points in the constellation for 16QAM in one exemplary embodiment of the present invention. The four corner points of the 16QAM constellation (shown in the figure as starred points) are taken as the constellation for the soft pilots. Two features of this embodiment can be readily recognized. First, the soft pilot constellation is equivalent to a scaled QPSK constellation. It thus offers the benefits of constant envelope and higher average power. Second, the soft pilot constellation points can be easily addressed within the higher-order constellation by keeping a subset of the bit labels fixed. In the example shown in FIG. 2, the soft pilot constellation points are those with the last two bit labels fixed at "11".

As noted, the use of soft pilot symbols causes the transmitted 16QAM or 64QAM symbols to have a higher average power. For example, if one in ten symbols for one channelization code is a soft pilot symbol, the average power is increased by 0.15 dB for 16QAM and by 0.54 dB for 64QAM. Alternatively, if there are fifteen channelization codes, and one in ten symbols for one of the fifteen channelization codes is a soft pilot symbol, the average power is increased by only 0.02 dB for 16QAM and by 0.04 dB for 64QAM. In practice, the transmitted power may have to be reduced by these amounts when utilizing soft pilots. It has been seen, however, that the net system performance is improved by the use of soft pilots.

Figure 3:
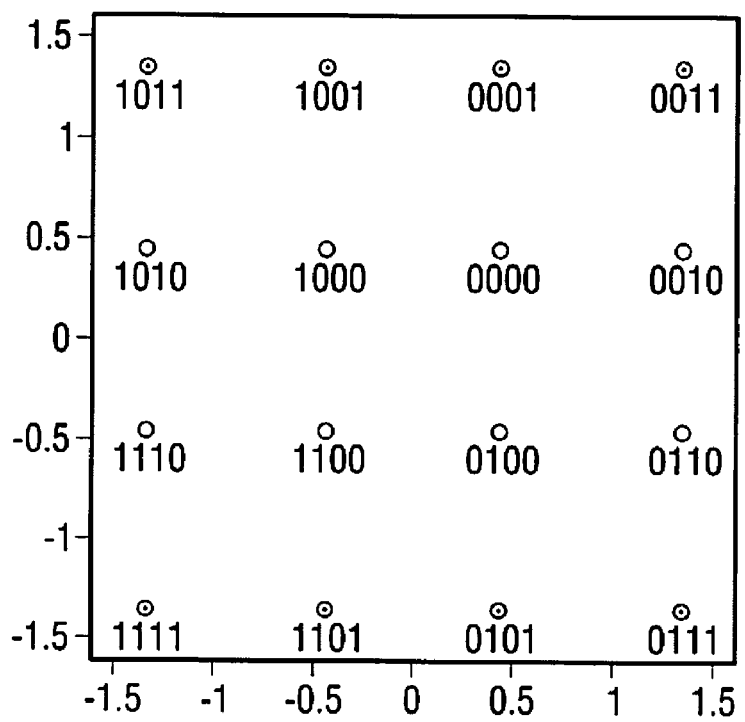
FIG. 3 shows the data bit mapping to points in the constellation for 16QAM in another exemplary embodiment of the present invention.

FIG. 3 shows the data bit mapping to points in the constellation for 16QAM in another exemplary embodiment of the present invention. In this embodiment, the soft pilot constellation size is enlarged to allow higher capacity for carrying data. However, the soft pilot constellation provides a constant quadrature amplitude feature which may be utilized to derive an amplitude reference. The soft pilot constellation points are addressed within the higher-order constellation by fixing the last bit label to "1." It is clear to those skilled in the art that an alternative soft pilot constellation may be specified by fixing the third bit label to "1", providing constant in-phase amplitude.

Soft Pilot Generation in HSPA:

The introduction of soft pilots reduces the number of channel coded bits that can be carried by the transmission signal. The reduction in channel coded bits can be implemented by two different approaches described below.

Figure 4:
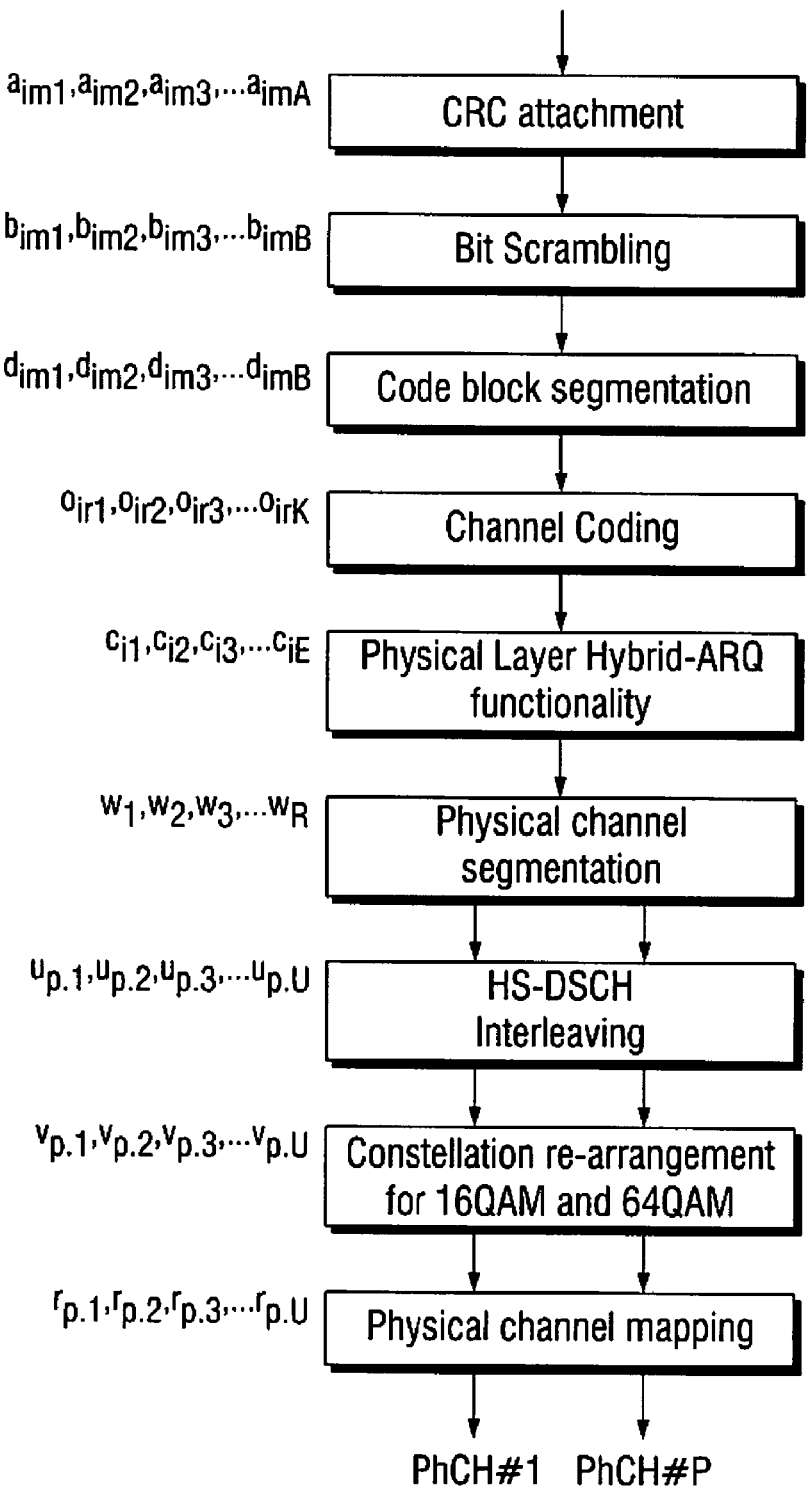
FIG. 4 (Prior Art) illustrates the existing channel coding chain for the HS-DSCH.

FIG. 4 illustrates the existing channel coding chain for the High Speed Downlink Shared Channel (HS-DSCH). In a first approach for implementing the reduction in channel coded bits, the behavior of the overall channel coding chain is changed similarly to the one for the HS-DSCH. The impact, however, is not simply a different number of coded bits to be output by the "physical-layer HARQ functionality", but rather a significant redesign and redefinition of several interconnect and intricate physical-layer procedures in "physical-layer HARQ functionality", "physical channel segmentation", "HS-DSCH interleaving", and "Constellation rearrangement". Such significant redesign of the critical channel coding chain will render most of the existing implementation obsolete and will be difficult to co-exist with new and legacy equipments in a network.

Figure 5:
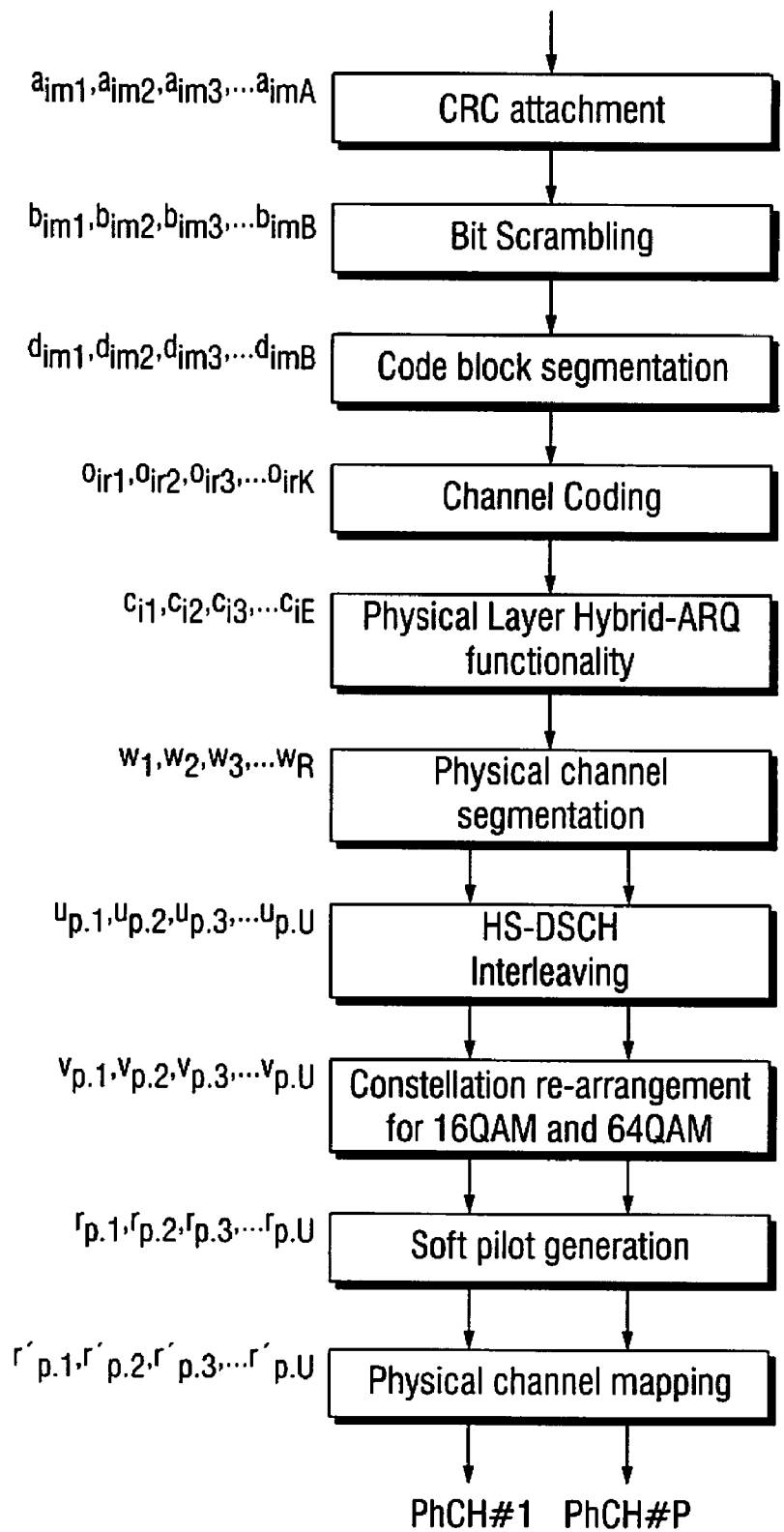
FIG. 5 illustrates the channel coding chain for the HS-DSCH in an exemplary embodiment of the present invention.

FIG. 5 illustrates the channel coding chain for the HS-DSCH in an exemplary embodiment of the present invention. In a second, preferred approach for implementing the reduction in channel coded bits, the soft pilot symbols are preferably generated by low-level puncturing of channel coded bits before the "physical channel mapping" stages of the channel coding chain. The preferred embodiment thus makes the presence of soft pilot symbols transparent to the "physical-layer HARQ functionality", "physical channel segmentation", "HS-DSCH interleaving", and "constellation rearrangement" stages.

Figure 6:
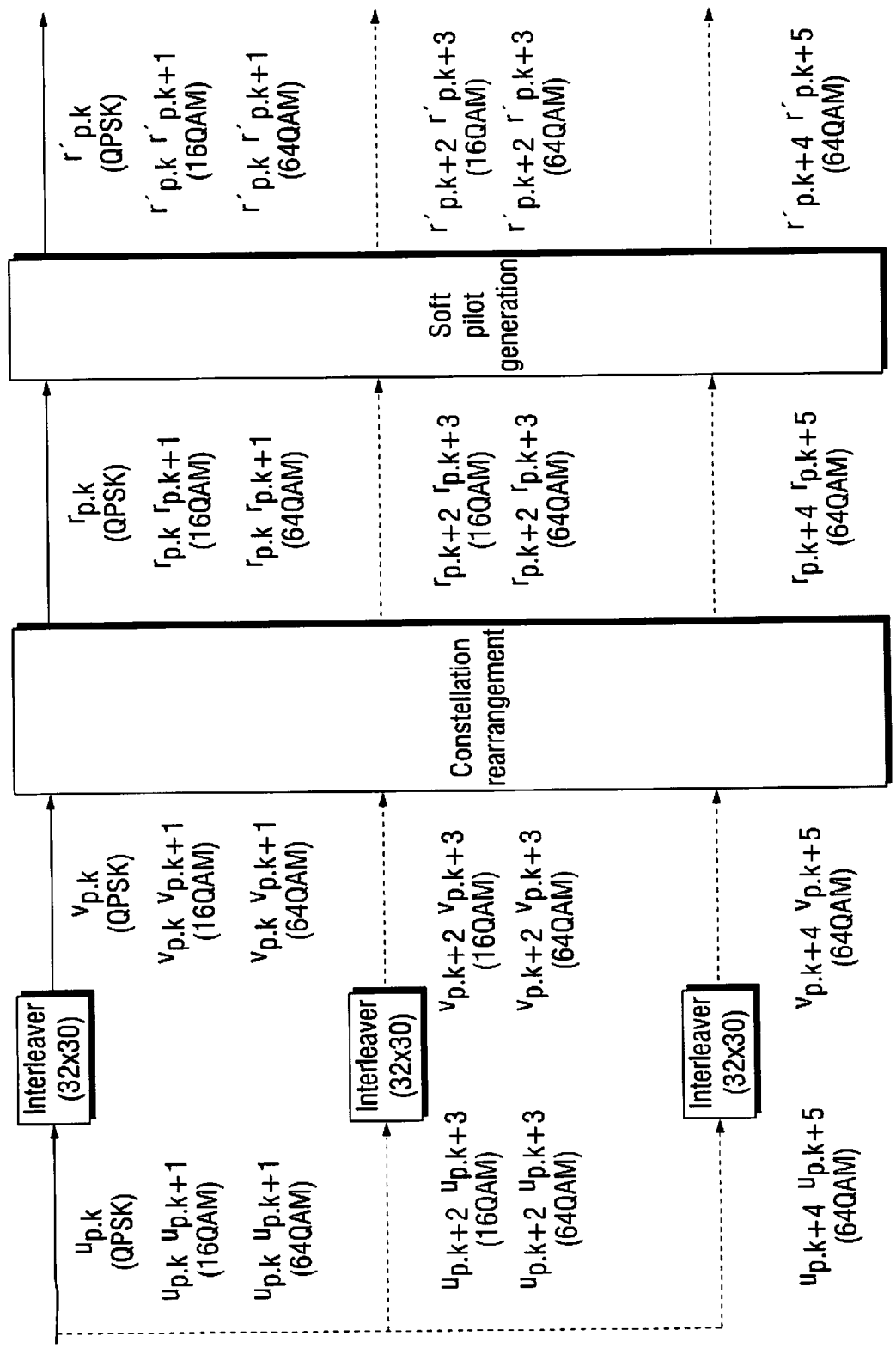
FIG. 6 is a flow diagram illustrating an overview of a soft pilot generation process in an exemplary embodiment of the present invention.

FIG. 6 is a flow diagram illustrating an overview of a soft pilot generation process in an exemplary embodiment of the present invention. In HSDPA, the bit collection procedure in physical-layer HARQ functionality and the HS-DSCH channel interleaving are designed to map systematic turbo-coded bits, if present, to the first bit labels of the 16QAM or 64QAM as much as possible. The purpose of this design is to ensure the important systematic turbo-coded bits are transmitted over the channel with higher reliability. As shown in FIG. 6, this is accomplished in the channel interleaver by utilizing pair-by-pair bit multiplexing and independent rectangular interleavers. When the data modulation is based on QPSK, only the first rectangular interleaver branch is active. When the data modulation is based on 16QAM, the first and the second rectangular interleaver branches are active. All three branches are active when the data is carried by 64QAM. Coupled with the constellation labeling specified in 3GPP, "Technical Specification Group Radio Access Network; Spreading and Modulation (FDD)," TS 25.213 v8, the bits in the first branch are transmitted over the channel with highest reliability. The bits in the third branch are transmitted with lowest reliability. Hence, in initial transmissions, the systematic bits are normally transmitted through the first branch as much as possible. For initial transmissions, the HARQ parameters are generally set such that the "constellation rearrangement" is effectively by-passed. It should be obvious to those skilled in the art that soft pilot symbols can be inserted right after the channel interleaving. For retransmissions, HARQ parameters can be used to instruct the "constellation rearrangement" to effectively retransmit channel coded bits with different reliability. Soft pilot symbols may be inserted into the signal after the "constellation rearrangement" procedure.

Figure 7:
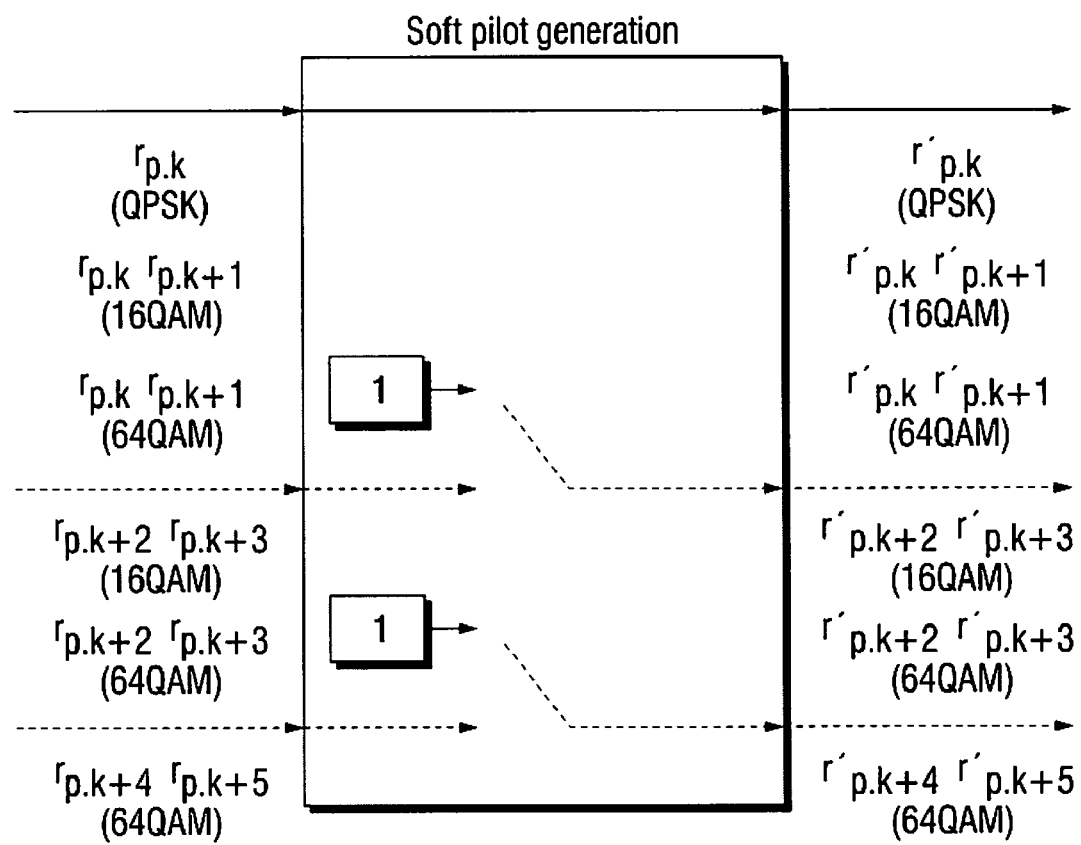
FIG. 7 is a flow diagram illustrating a soft pilot generation process for the HS-DSCH in an exemplary embodiment of the present invention.

FIG. 7 is a flow diagram illustrating a soft pilot generation process for the HS-DSCH in an exemplary embodiment of the present invention. The coded bit inputs are denoted by $r_{p,k}$ and the outputs are denoted by $r'_{p,k}$. Normally, the input bits are passed to the output without modification: $r'_{p,k}=r_{p,k}$. If a scaled QPSK soft pilot symbol (such as that shown in FIG. 2) is inserted to replace a 16QAM data symbol, then $r'_{p,k}=r_{p,k}$, $r'_{p,k+1}=r_{p,k+1}$, $r'_{p,k+2}=1$, and $r'_{p,k+3}=1$. If a scaled QPSK soft pilot symbol is inserted to replace a 64QAM data symbol, then $r'_{p,k}=r_{p,k}$, $r'_{p,k+1}=r_{p,k+1}$, $r'_{p,k+2}=1$, $r'_{p,k+3}=1$, $r'_{p,k+4}=1$, and $r'_{p,k+5}=1$.

If a soft pilot symbol with constant quadrature amplitude (such as that shown in FIG. 3) is inserted to replace a 16QAM data symbol, then $r'_{p,k}=r_{p,k}$, $r'_{p,k+1}=r_{p,k+1}$, $r'_{p,k+2}=r_{p,k+2}$, and $r'_{p,k+3}=1$. If a soft pilot symbol with constant quadrature amplitude is inserted to replace a 64QAM data symbol, then $r'_{p,k}=r_{p,k}$, $r'_{p,k+1}=r_{p,k+1}$, $r'_{p,k+2}=r_{p,k+2}$, $r'_{p,k+3}=1$, $r'_{p,k+4}=r_{p,k+4}$, and $r'_{p,k+5}=1$. If a soft pilot symbol with constant in-phase amplitude is inserted to replace a 16QAM data symbol, then $r'_{p,k}=r_{p,k}$, $r'_{p,k+1}=r_{p,k+1}$, $r'_{p,k+2}=1$, and $r'_{p,k+3}=r_{p,k+3}$. If a soft pilot symbol with constant in-phase amplitude is inserted to replace a 64QAM data symbol, then $r'_{p,k}=r_{p,k}$, $r'_{p,k+1}=r_{p,k+1}$, $r'_{p,k+2}=1$, $r'_{p,k+3}=r_{p,k+3}$, $r'_{p,k+4}=1$, and $r'_{p,k+5}=r_{p,k+5}$.

Figure 8:
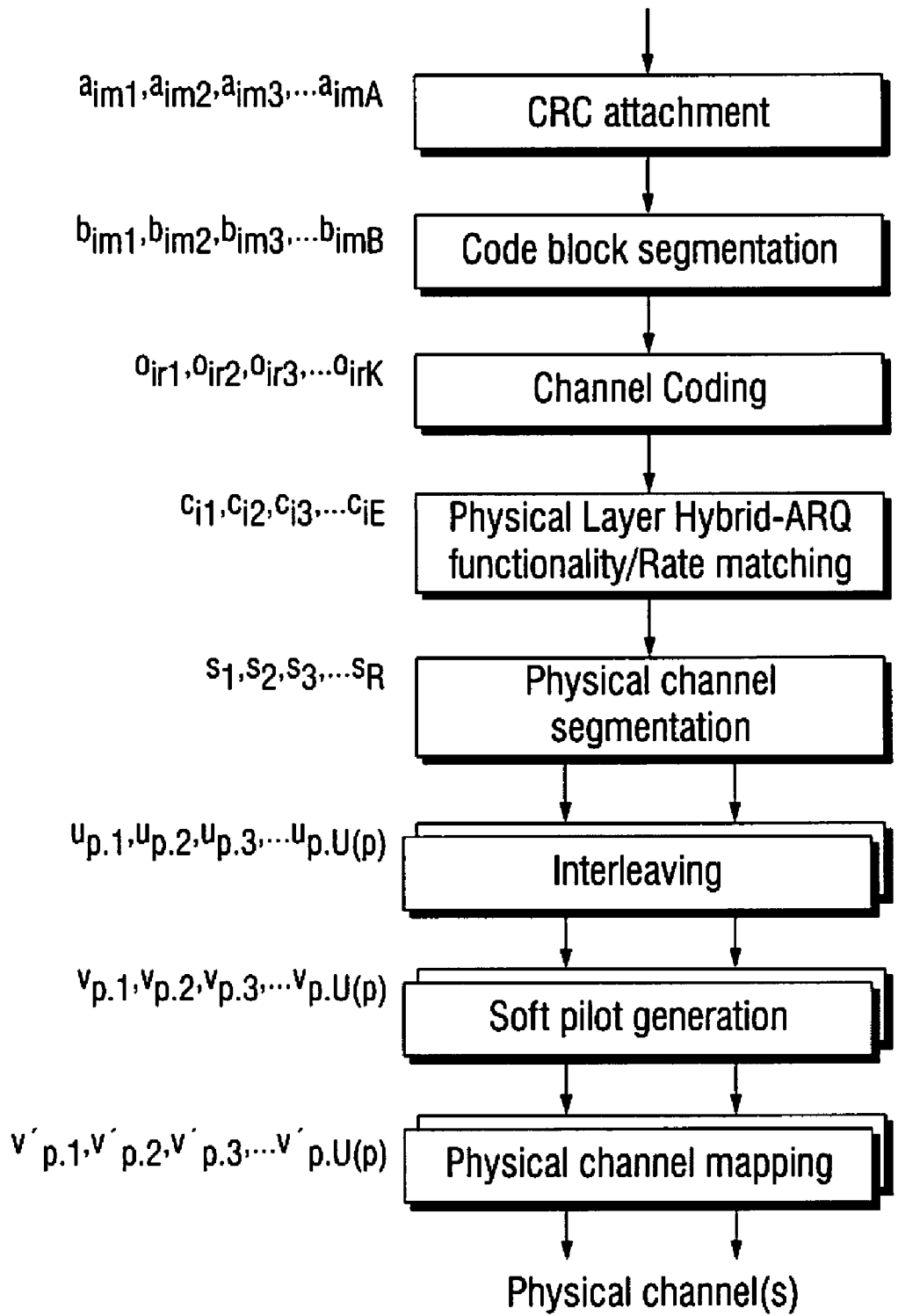
FIG. 8 is a flow diagram illustrating a soft pilot generation process for the E-DCH in an exemplary embodiment of the present invention.

Soft Pilot Generation for the Enhanced Dedicated Channel (E-DCH):

FIG. 8 is a flow diagram illustrating a soft pilot generation process for the E-DCH in an exemplary embodiment of the present invention. To accomplish reliability identification similar to that in HS-DSCH, the bit collection procedure in physical-layer HARQ functionality and the channel interleaving are designed to map systematic turbo-coded bits, if present, to the first bit labels of the 4PAM as much as possible. According to the preferred embodiment, the soft pilot symbols are generated after the E-DCH channel interleaving.

Figure 9:
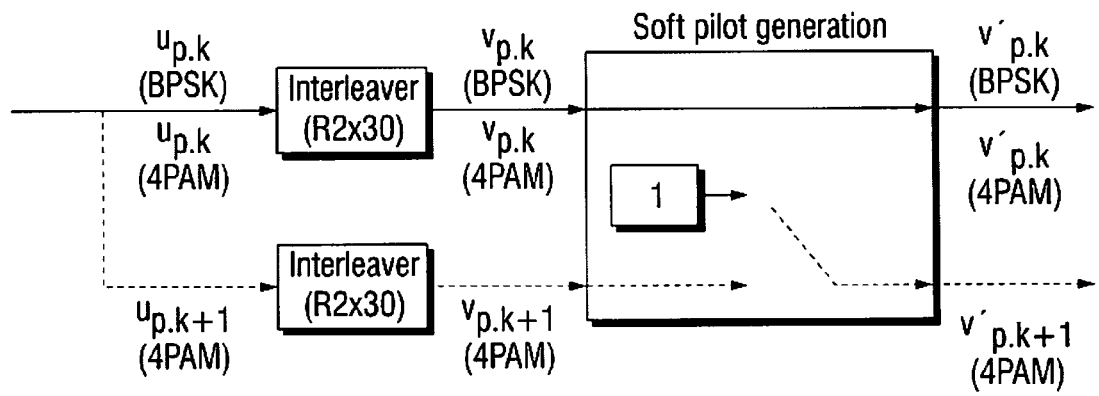
FIG. 9 is a functional block diagram of an exemplary embodiment of an interleaver structure for the E-DCH.

FIG. 9 is a functional block diagram of an exemplary embodiment of an interleaver structure for the E-DCH. The channel interleaving is facilitated by two rectangular interleaver branches when the data is carried by 4PAM. The coded bit inputs to the "soft pilot generation" are denoted by $v_{p,k}$ and the outputs are denoted by $v'_{p,k}$. Normally, the input bits are passed to the output without modification: $v'_{p,k}=v_{p,k}$. If a scaled BPSK soft pilot symbol is inserted to replace a 4PAM data symbol, then $v'_{p,k}=v_{p,k}$, $v'_{p,k+1}=1$.

According to the preferred embodiment, the soft pilot symbols are generated by puncturing channel coded bits at fixed locations (in terms of time and code/frequency). On the receiver side, the soft values corresponding to the punctured bits are set to zero. With this, the use of the soft pilot symbols introduces no changes to the core de-rate-matching and channel decoder implementation.

Note also that, according to this embodiment, the soft pilot symbols are generated by puncturing channel coded bits that are mapped to the least reliable bit labels. Since the soft values corresponding to these low-reliability bits are normally very small, setting them to zero introduces negligible impact to the overall channel coding performance.

Location of Soft Pilot Symbols:

Soft pilot symbols may be imbedded on the same code, on a single separate code, on different antennas in Multiple-Input-Multiple-Output (MIMO) systems, and the like. The placement may be coordinated so that the soft pilot symbols either coincide or do not coincide on different codes and/or antennas.

The soft pilot symbols can be inserted into the signal in several practical ways:

1. HSPA—one code assigned to the HSPA user utilizes soft pilot symbols while other codes assigned to the same user utilize a higher order modulation.

2. HSPA—certain data symbols within each code assigned to the HSPA user are soft pilot symbols while the remaining symbols in the codes are conventional data symbols. For example, symbols 0 through N−1 on code A, N through 2N−1, on code B, and so on may be soft pilot symbols.

3. HSPA—symbols N through 2N are soft pilot symbols on all codes assigned to the HSPA user while the remaining symbols in the codes assigned to the same user are conventional data symbols.

4. Long Term Evolution (LTE)—replace demodulation pilots with soft pilot symbols for some (or all) of the embedded demodulation pilots.

The following embodiments are designed with further consideration of (a) supporting time-varying channels, (b) minimizing coding performance impact, and (c) reducing impact on peak-to-average ratio (PAR).

Figure 10:
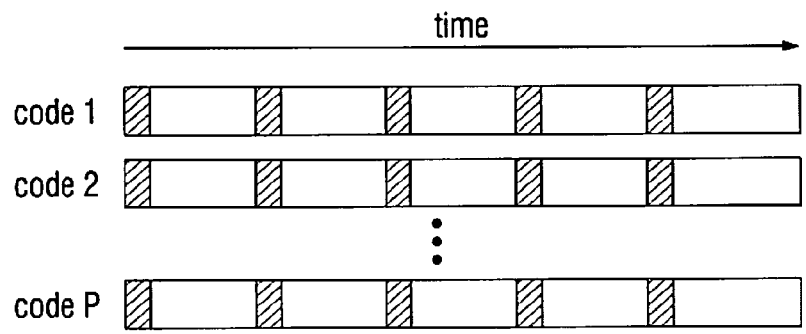
FIG. 10 illustrates a first exemplary embodiment of soft pilot symbol location.

FIG. 10 illustrates a first exemplary embodiment of soft pilot symbol location. The soft pilot symbols are spread out in time to provide a more reliable reference for time-varying channels. The exact locations of the symbols may be specified by periodic patterns. To allow for averaging for estimation noise reduction, the soft pilot symbols may be present in more than one code at the same spread-out locations. In contrast to concentrating the soft pilot symbols into only one (or very few codes), the spread-out pattern across codes minimizes the impact on overall channel decoding performance.

Figure 11:
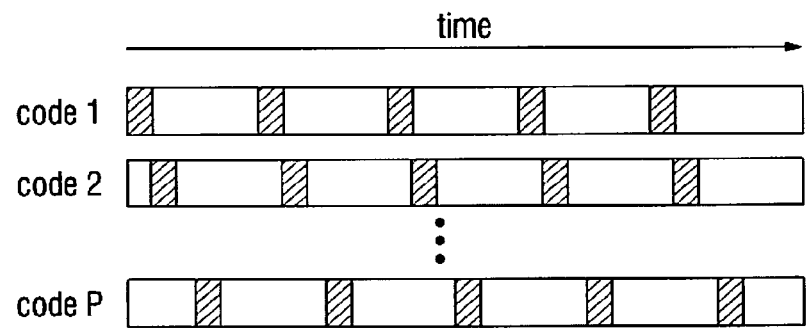
FIG. 11 illustrates a second exemplary embodiment of soft pilot symbol location.

FIG. 11 illustrates a second exemplary embodiment of soft pilot symbol location. The embodiment previously illustrated in FIG. 10 is suitable only if the soft pilot symbols do not contribute to substantial increase in PAR. If the PAR increase is of concern, the embodiment of FIG. 11 can be adopted. The soft pilot symbol locations between different codes are offset to reduce PAR increase.

The use of soft pilot symbols provides several benefits. First, the soft pilot symbols are more robust than the surrounding symbols, thereby providing reliable decision-directed parameter estimation. Second, the soft pilot symbols may still carry some data, contrasted to fixed pilot symbols, which allow no data throughput for the symbol. Third, by making the soft pilot symbols "constant envelope" modulation symbols inserted among higher order modulation symbols, the soft pilot symbols become particularly helpful in establishing the amplitude reference essential for demodulating the higher order modulation symbols.

The use of soft pilot symbols is applicable to any wired or wireless communication system. Soft pilots provide higher data throughput than traditional pilot-aided schemes, and do not sacrifice performance as most blind estimation schemes do. The soft pilot approach requires that the receiver use a data-aided approach. However, as opposed to traditional data-aided approaches, the present invention specifies the modulation and location (in time/code/frequency) of the soft pilot symbols so that the receiver will know that there are certain high-quality symbols that can be used in a data-aided approach. Receiver estimation algorithms based on such symbols are less error-prone and provide consistently good parameter and/or signal quality estimates.

An HSPA receiver that can utilize such soft pilots is fully described below in an exemplary embodiment consisting of a data-aided Generalized Rake (G-Rake) receiver. By way of background, the G-Rake receiver receives and processes WCDMA signals experiencing interference in dispersive channels. This interference is composed of self-interference (intersymbol interference), multiple access interference (interference due to non-zero code cross correlation), and other cell (downlink) or other user (uplink) interference. This interference must be suppressed in order to achieve good HSDPA throughput. In addition, the enhanced throughput requirements set by 3GPP for type 2 (single antenna terminal) and type 3 (dual antenna terminal) receivers cannot be met without interference suppression.

Linear methods for suppressing interference generally fall into the categories of chip level or symbol level equalization. Symbol level equalization follows the traditional Rake architecture where the received chip-level data is despread at multiple delays, and then the multiple images are combined. Chip level equalization reverses the order of these operations; the received chip data is first combined using a linear filter and then despread at a single delay. These techniques are generally equivalent from a performance perspective.

Figure 12:
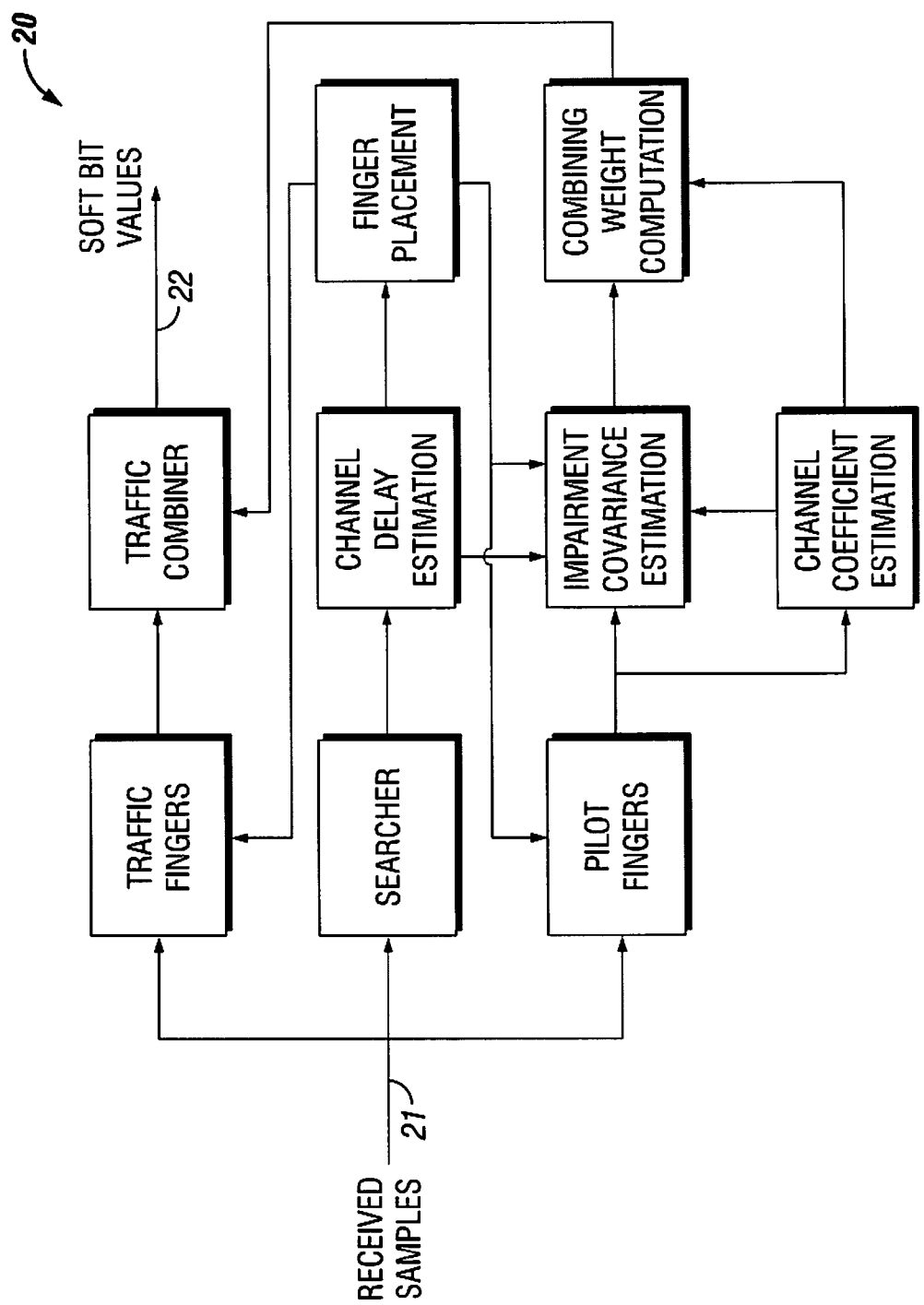
FIG. 12 is a functional block diagram of an exemplary embodiment of a two-pass G-Rake receiver of the present invention.

FIG. 12 is a functional block diagram of a G-Rake receiver 20 which may be modified to utilize the present invention. The receiver may be implemented, for example, in a mobile terminal or other wireless communication device. Spread-spectrum signals are transmitted through a radio channel and are received at one or more antennas of the receiver. A radio processor (not shown) generates a series of digitized baseband signal samples 21 from the received signal and inputs them to the G-RAKE receiver. In turn, the G-Rake receiver 20 demodulates the received signal samples to produce soft values or bit estimates 22. These estimates are provided to one or more additional processing circuits (not shown) for further processing, such as forward-error-correction (FEC) decoding and conversion into speech, text, or graphical images, and the like. Those skilled in the art will recognize that the particular information type(s) carried by the received signal and the particular processing steps applied by the receiver 20 are a function of its intended use and type.

A complete description of a G-Rake receiver suitable for use with the soft pilot symbols of the present invention is provided in co-owned U.S. Patent Application Publication No. 2005/0201447, the disclosure of which is incorporated herein by reference in its entirety.

Turning first to symbol level equalization, the G-Rake combining weights perform the coherent combining as well as interference suppression. The combining weights are given by:

$$w = R_u^{-1} h, \quad (1)$$

where $R_u$ is the impairment covariance matrix and h is a vector of net channel coefficients. It should be noted that the term "impairment" includes both interference and noise while the term "net channel coefficient" refers to a channel coefficient that includes the effects of the transmit and receive filters as well as the fading channel.

There are two general methods for implementing a G-Rake receiver. These methods are generally known as nonparametric and parametric. The nomenclature here focuses on the approach taken to obtain the impairment covariance matrix. Nonparametric method(s) are blind, and estimate $R_u$ directly from observed data. The parametric method assumes an underlying model, and computes $R_u$ from model parameters. Examples of both methods are provided below.

There are two ways that one can obtain a nonparametric estimate of the impairment covariance matrix. The first approach uses the pilot channel to estimate the slot-based quantities:

$$\hat{h} = \frac{1}{N_p} \sum_{k=0}^{N_p - 1} x_p(k) s^* \quad (2)$$

$$\hat{R}_{u,slot} = \frac{1}{N_p - 1} \sum_{k=0}^{N_p - 1} (x_p(k) s^* - \hat{h})(x_p(k) s^* - \hat{h})^H$$

Using these quantities, the impairment covariance matrix can be obtained from:

$$\hat{R}_u(n) = \lambda \hat{R}_u(n-1) + (1-\lambda) \hat{R}_{u,slot}. \quad (3)$$

Another approach for generating a nonparametric estimate of the impairment covariance matrix involves the use of unoccupied traffic codes as described in co-owned and co-pending U.S. patent application Ser. No. 12/135,268 filed Jun. 9, 2008. The despread values for these codes contain impairment samples only. These impairment samples can be used to directly estimate $R_u$ as follows:

$$\hat{R}_u = \frac{1}{N_c N_T} \sum_{q=0}^{N_c - 1} \sum_{k=0}^{N_T - 1} x_{traffic}^q(k) (x_{traffic}^q(k))^H \quad (4)$$

Here, $x_{traffic}^q(k)$ is a despread vector of traffic symbols for the qth code during the kth symbol interval, $N_T$ is the number of symbols per code, and $N_c$ is the number of codes.

The parametric approach for generating the impairment covariance matrix depends upon a model for the interference as described in co-owned U.S. Patent Application Publication No. 2005/0201447. This model depends upon the radio channel(s) between the UE and the modeled base station(s). Assuming a single serving base station and J interfering base stations, the model for the impairment covariance matrix is given by:

$$R_u = E_c(0) R_I^{own}(g_0) + \sum_{j=1}^{J} E_c(j) R_I^{other}(g_j) + N_0 R_n \quad (5)$$

where:

$$R_I^{own}(g_j; d_1, d_2) = \sum_{\lambda=0}^{L-1} \sum_{n=0}^{L-1} g_j(\lambda) g_j^*(n) \quad (6)$$

$$\sum_{\substack{m=-\infty \\ m \neq 0}}^{\infty} R_p(d_1 - mT_c - \tau_k(\lambda)) R_p^*(d_2 - mT_c - \tau_k(n))$$

$$R_I^{other}(g_j; d_1, d_2) = \sum_{\lambda=0}^{L-1} \sum_{n=0}^{L-1} g_J(\lambda) g_j^*(n)$$

$$\sum_{m=-\infty}^{\infty} R_p(d_1 - mT_c - \tau_k(\lambda)) R_p^*(d_2 - mT_c - \tau_k(n))$$

$$R_n(d_1, d_2) = R_p(d_1 - d_2)$$

Here, $E_c(j)$ is the total chip energy for base station j, $g_j$ is a vector of radio channel (medium) coefficients for the channel between the UE and the jth base station, $R_p(\theta)$ represents the convolution of the transmit and receive pulse shape filters evaluated at $\theta$, $\tau_j$ is a vector of L channel delays corresponding to the channel between the UE and the jth base station, $T_c$ is the chip time, and $d_k$ is the delay of the kth finger employed by the UE.

Chip equalization is discussed in G. Kutz et al., "Sparse Chip Equalizer for DS-CDMA Downlink Receivers", *IEEE Communication Letters*, vol. 9, no. 1, pp. 10-12, 2005. According to Kutz, the received signal at the chip level is given by:

$$r = Hc + v. \quad (7)$$

Here, r is a N+L−1 block of received chips, H is the (N+L−1)×N sized Toeplitz convolution matrix whose columns are time shifted versions of the channel impulse response h with delay spread L (chip or sub-chip spaced version of the net channel coefficients), v represents white Gaussian noise due to neighboring base stations and thermal noise, and c is the transmitted chip sequence. The chip equalizer filter f that suppresses the interference in equation (7) is the solution to:

$$f = A^{-1} b, \quad (8)$$

where
$A = E\{X^H X\}$
$b = E\{X^H C_p^H p\}$
$X = C_p^H R$
$C_p = N \times S$ sized pilot scrambling and spreading matrix
$p$ = pilot chip sequence Note that it is assumed that there are S pilot symbols per data block and that the columns of matrix R are time-shifted versions of the chip level received signal r.

Similar to G-Rake, there are several ways to generate the chip equalizer filter. One may use a parametric approach, a nonparametric approach, and a direct adaptation approach. The parametric and nonparametric forms differ (primarily) in how the A matrix is calculated. The nonparametric form uses the received chip data directly to calculate the A matrix via:

$$A \approx \frac{1}{N + L - 1} R^H R. \quad (9)$$

In contrast, the parametric form works instead with the channel impulse response and the powers of the serving base station and the white Gaussian noise. The entries of the A matrix for the parametric form can be written as:

$$A(i, j) = I_{or} \sum_n h^*(n)h(n + \tau_i - \tau_j) + I_{oc}\delta(i - j), \quad (10)$$

where $\tau_k$ is the $k^{th}$ chip equalizer tap delay, $I_{or}$ is the serving base station power, and $I_{oc}$ is the white Gaussian noise power. The direct adaptation approach treats the equalization problem as an adaptive filtering problem. It uses the common pilot signal as a known reference to train the filter taps using any of the common adaptive filter algorithms (LMS, RLS, etc.).

The existing parametric and non-parametric equalization approaches have different strengths and weaknesses. The strengths and weaknesses of the G-Rake parametric/nonparametric approaches are discussed below. It is assumed that these strengths/weaknesses hold for chip equalization as well.

The strength of the parametric approach is that performance (BER, BLER, or throughput) is relatively insensitive to UE speed. The main weakness of the parametric approach is that it relies on channel information developed by the path searcher/delay estimator. If this information is incorrect, then the effective color of the impairment will be mis-modeled leading to performance degradation.

The strength of the nonparametric approach is that it is a blind technique. There is no specific model for interference, so all interference is captured by the estimation approach. This blind approach, however, is also indirectly a weakness. Blind approaches typically need a significant amount of "training" data to perform well. The pilot channel has only 10 symbols per slot, so the pilot-based approach to covariance estimation requires significant smoothing (filtering) to work well. Smoothing limits the effectiveness of the approach to low speed. The unused code approach is highly effective if a set of unused codes can be identified. However, identifying unused codes in the downlink is quite problematic.

It is noted that there is a further weakness inherent in existing equalization techniques. There appears to be an irreducible error floor (i.e., performance ceiling) for practical receiver implementations based on the existing standard. No such phenomenon occurs for a genie receiver. In order to increase the peak data rates offered in practice, a practical receiver must more closely mimic the performance of the genie receiver. It is contemplated that WCDMA release 9 will add more pilot symbols so that nonparametric and/or direct adaptation receivers perform better. The present invention offers an alternative to this approach, which reduces the peak throughput only marginally yet still achieves close to genie receiver performance.

In the two-pass G-Rake receiver of the present invention, the first pass computes a set of "approximate" or "rough" combining weights. These combining weights are used to coherently combine the symbols from one or more traffic codes The combined values are rescaled to some target constellation power and hard symbol decisions are made (i.e., no decoder involvement). The hard symbol decisions are then used as demodulation pilots and the impairment covariance matrix is recalculated nonparametrically using these demodulation pilots. From the recalculated impairment covariance matrix, a set of second pass combining weights are computed. These combining weights are used to coherently combine all the traffic data. When utilizing soft pilot symbols, the receiver operation is the same except that the first pass combining weights are only applied to the soft pilot symbols.

Figure 13:
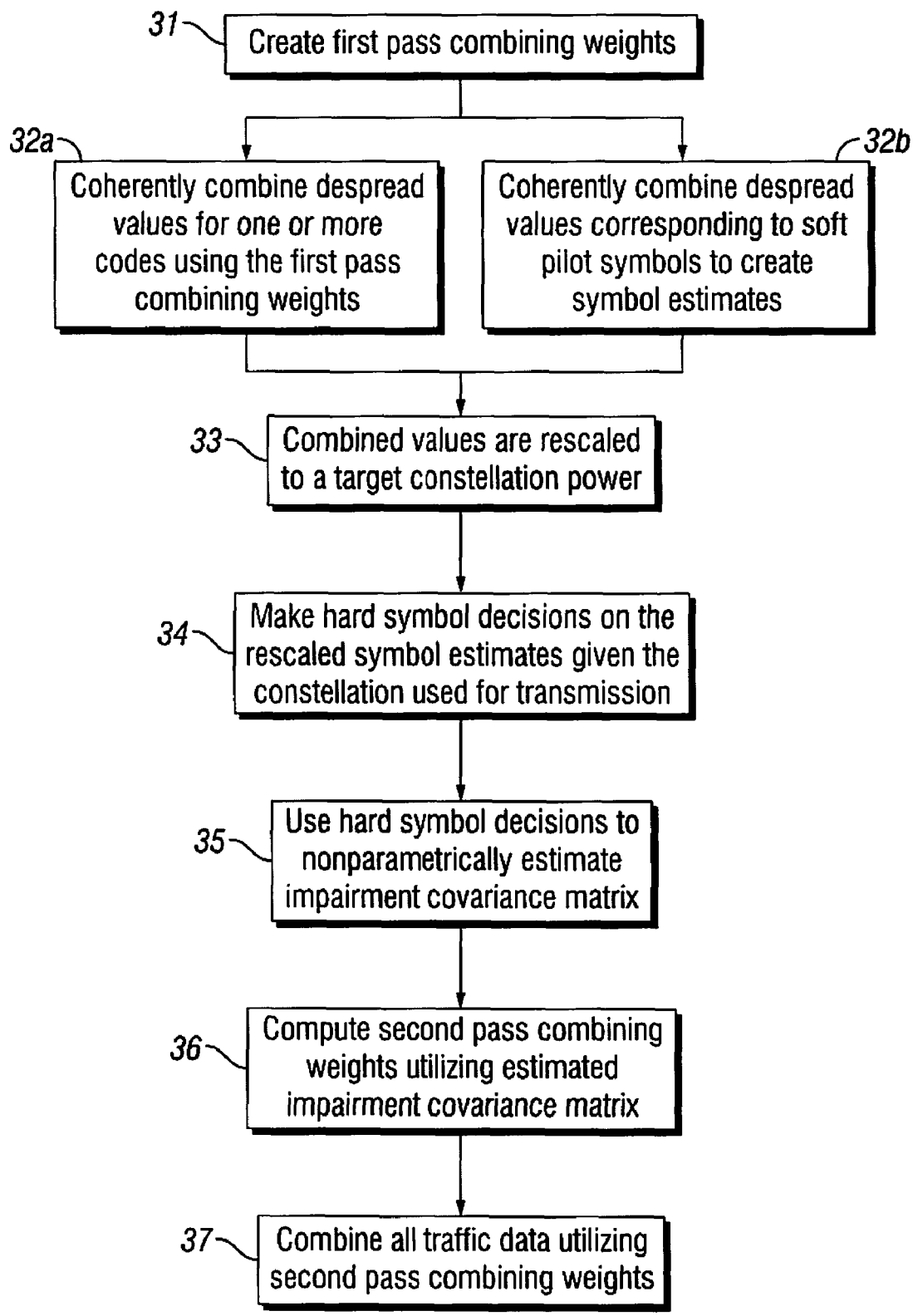
FIG. 13 is a flow chart illustrating an exemplary embodiment of a processing method performed by the two-pass G-Rake receiver of the present invention.

FIG. 13 is a flow chart illustrating an exemplary embodiment of a processing method performed by the two-pass G-Rake receiver of the present invention. At step 31, first pass combining weights are created. At step 32a, despread values for one or more codes are coherently combined using the first pass combining weights. Alternatively, the process may move to step 32b where despread values corresponding to soft pilot symbols are coherently combined to create symbol estimates. At step 33, the symbol estimates are rescaled to some target constellation power. At step 34, hard symbol decisions are made on the rescaled symbol estimates given the constellation used for transmission. At step 35, the hard symbol decisions are utilized to nonparametrically estimate the impairment covariance matrix. At step 36, second pass combining weights are computed utilizing the estimated impairment covariance matrix. At step 37, all traffic data is combined utilizing the second pass combining weights.

This process can be realized in different ways depending upon the scenario. For single stream SISO/SIMO/MIMO scenarios, there are two variants. Similarly for the dual stream MIMO scenario, there are at least two variants. Each variant is described in an alternative embodiment below.

First, a single stream SISO/SIMO symbol level embodiment will be described. For the first pass of demodulation, combining weights are computed via:

$$w_{first} = \hat{R}_{u,first}^{-1}\hat{h}, \quad (11)$$

where $$\hat{h} = \frac{1}{N_p}\sum_{m=0}^{N_p-1} x_p(n, m)s^* \quad (12)$$

$$\hat{R}_{u,first} \approx \frac{1}{N_c K}\sum_{c=0}^{N_c-1}\sum_{k=0}^{N_t-1} x_t^c(n, k)(x_t^c(n, k))^H$$

In the above equation, $x_p(n,m)$ represents a vector of despread common pilot values corresponding to the $m^{th}$ pilot symbol interval during the $n^{th}$ slot, $x_t^c(n,k)$ represents a vector of despread traffic values corresponding to the $k^{th}$ traffic symbol interval during the $n^{th}$ slot for the $c^{th}$ code, $N_p$ is the number of common pilot symbols per slot, $N_c$ is the number of traffic codes used for estimation, and $N_t$ is the number of data symbols per slot.

It is assumed that a single traffic code is used to create symbol estimates (note: what follows could easily be extended to multiple traffic codes). The first-pass combining weights $w_{first}$ are applied to traffic code f to create symbol estimates via:

$$\hat{z}(k) = w_{first}^H x_t^f(n,k). \quad (13)$$

These symbol estimates are translated to hard symbol decisions by normalizing the energy of the symbol estimates to some target constellation power (e.g. unity) and then selecting the constellation point closest to each symbol estimate. This procedure can be described mathematically as:

$$\Delta = \frac{1}{K}\sum_{k=0}^{K-1}|\hat{z}(k)|^2 \quad (14)$$

$$\tilde{z}(k) = \frac{\hat{z}(k)}{\sqrt{\Delta}}$$

$$j_{min} = \underset{j}{\operatorname{argmin}}|\tilde{z}(k) - \kappa(j)|^2 \forall \kappa(j) \in S$$

$$\hat{s}(k) = \kappa(j_{min})$$

where $\kappa(j)$ is the value of the $j^{th}$ constellation point taken from the set of constellation points S. The hard decisions are then used to construct a more accurate estimate of the impairment covariance matrix via:

$$\hat{h}_t = \frac{1}{N_t}\sum_{k=0}^{N_t-1} x_t^f(n,k)\hat{s}^*(k) \quad (15)$$

$$\hat{R}_d = \frac{1}{N_t}\sum_{k=0}^{N_t-1} x_t^f(n,k)(x_t^f(n,k))^H$$

$$\hat{R}_{u,second} = \hat{R}_d - \hat{h}_t\hat{h}_t^H$$

The more accurate estimate of the impairment covariance matrix is then used to compute the second pass combining weights:

$$w_{second} = \hat{R}_{u,second}^{-1}\hat{h}_t \quad (16)$$

and the second pass combining weights are used to coherently combine all the despread traffic data.

Another embodiment is the single stream SISO/SIMO chip level/symbol level embodiment. This embodiment is identical to the symbol level embodiment except that the matrix $\hat{R}_{u,first}$ used to compute first pass combining weights $$w_{first} = \hat{R}_{u,first}^{-1}\hat{h} \quad (17)$$

is computed from chip level data. A nonparametric method for realizing this is described above in the prior art section. Specifically, the method of equation (9) is adopted, where the columns of matrix R are time-shifted versions of the chip level received signal r. The setting $\hat{R}_{u,first}$=A is made and then the first pass combining weights are calculated. The remainder of the embodiment takes place at the symbol level and is identical to the single stream SISO/SIMO symbol level embodiment.

Another embodiment is the dual stream MIMO symbol level embodiment. This description assumes the D-TxAA MIMO transmission scheme standardized in WCDMA release 7 is utilized, although the invention is general enough to cover other 2×2 MIMO schemes. For the first pass of demodulation, combining weights are computed via:

$$w_{first,1} = \hat{R}_x^{-1}\hat{h}_{eff}(b_1) \quad (18)$$

$$w_{first,2} = \hat{R}_x^{-1}\hat{h}_{eff}(b_2).$$

where $$\hat{h}_1 = \frac{1}{N_p}\sum_{m=0}^{N_p-1} x_p(n,m)s_1^*(m) \quad (19)$$

$$\hat{h}_2 = \frac{1}{N_p}\sum_{m=0}^{N_p-1} x_p(n,m)s_2^*(m)$$

$$h_{eff}(b_1) = b_{11}\hat{h}_1 + b_{21}\hat{h}_2$$

$$\hat{h}_{eff}(b_2) = b_{12}\hat{h}_1 + b_{22}\hat{h}_2$$

$$\hat{R}_x \approx \frac{1}{N_cK}\sum_{c=0}^{N_c-1}\sum_{k=0}^{N_t-1} x_t^c(n,k)(x_t^c(n,k))^H.$$

In the above equation, $x_p(n,m)$ represents a vector of despread common pilot values corresponding to the $m^{th}$ pilot symbol interval during the $n^{th}$ slot, $x_t^c(n,k)$ represents a vector of despread traffic values corresponding to the $k^{th}$ traffic symbol interval during the $n^{th}$ slot for the $c^{th}$ code, $N_p$ is the number of common pilot symbols per slot, $N_c$ is the number of traffic codes used for estimation, $N_t$ is the number of data symbols per slot, $s_1(m)$ is the $m^{th}$ pilot symbol transmitted from antenna 1, $s_2(m)$ is the $m^{th}$ pilot symbol transmitted from antenna 2, and $b_1$ and $b_2$ are the columns of preceding matrix B used to transmit streams 1 and 2 (i.e. B=[$b_1$ $b_2$]).

We assume that a single traffic code is used to create symbol estimates (note: what follows could easily be extended to multiple traffic codes). The first-pass combining weights $w_{first,1}$ and $w_{first,2}$ are applied to traffic code f to create symbol estimates via:

$$\hat{z}_1(k) = w_{first,1}^H x_t^f(n,k) \quad (20)$$

$$\hat{z}_2(k) = w_{first,2}^H x_t^f(n,k).$$

These symbol estimates are translated to hard symbol decisions by normalizing the energy of the symbol estimates to some target constellation power and then selecting the constellation point closest to each symbol estimate. This procedure can be described mathematically as:

$$\Delta_1 = \frac{1}{K}\sum_{k=0}^{K-1}|\hat{z}_1(k)|^2 \quad (21)$$

$$\tilde{z}_1(k) = \frac{\hat{z}_1(k)}{\sqrt{\Delta_1}}$$

$$j_{min} = \underset{j}{\operatorname{argmin}}|\tilde{z}_1(k) - \kappa(j)|^2 \forall \kappa(j) \in S$$

$$\hat{s}_1(k) = \kappa(j_{min})$$

$$\Delta_2 = \frac{1}{K}\sum_{k=0}^{K-1}|\hat{z}_2(k)|^2$$

$$\tilde{z}_2(k) = \frac{\hat{z}_2(k)}{\sqrt{\Delta_2}}$$

$$j_{min} = \underset{j}{\operatorname{argmin}}|\tilde{z}_2(k) - \kappa(j)|^2 \forall \kappa(j) \in S$$

$$\hat{s}_2(k) = \kappa(j_{min}),$$

where $\kappa(j)$ is the value of the $j^{th}$ constellation point taken from the set of constellation points S.

The hard decisions are then used to construct a more accurate estimate of the impairment covariance matrix via:

$$\hat{h}_{t,1} = \frac{1}{N_t} \sum_{k=0}^{N_t-1} x_t^f(n,k) \hat{s}_1^*(k) \quad (22)$$

$$\hat{h}_{t,2} = \frac{1}{N_t} \sum_{k=0}^{N_t-1} x_t^f(n,k) \hat{s}_2^*(k)$$

$$\hat{R}_d = \frac{1}{N_t} \sum_{k=0}^{N_t-1} x_t^f(n,k) (x_t^f(n,k))^H$$

$$\hat{R}_{x,1} = \hat{R}_d - \hat{h}_{t,1} \hat{h}_{t,1}^H$$

$$\hat{R}_{x,2} = \hat{R}_d - \hat{h}_{t,2} \hat{h}_{t,2}^H.$$

The more accurate estimate of the impairment covariance matrix is then used to compute the second pass combining weights $$w_{second,1} = \hat{R}_{x,1}^{-1} \hat{h}_{eff}(b_1) \quad (23)$$

$$w_{second,2} = \hat{R}_{x,2}^{-1} \hat{h}_{eff}(b_2),$$

and the second pass combining weights are used to coherently combine all the despread traffic data for both streams.

Note: for the first receiver pass, $\hat{R}_x$ may be obtained using a parametric G-Rake formulation. There is a significant advantage to this approach if a QAM modulation is employed.

Another embodiment is the dual stream MIMO chip level/symbol level embodiment. This embodiment is identical to the symbol level embodiment except that the matrix $\hat{R}_x$ used to compute first pass combining weights $$w_{first,1} = \hat{R}_x^{-1} \hat{h}_{eff}(b_1) \quad (24)$$

$$w_{first,2} = \hat{R}_x^{-1} \hat{h}_{eff}(b_2)$$

is computed from chip level data. A nonparametric method for realizing this is described above. Specifically, the method of equation (9) is adopted, where the columns of matrix R are time-shifted versions of the chip level received signal r. The setting $\hat{R}_x = A$ is made, and then the first pass combining weights are calculated. The remainder of the embodiment takes place at the symbol level and is identical to the dual stream MIMO symbol level embodiment.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a generalized Rake (G-Rake) receiver for processing a received radio signal that includes a sequence of transmitted symbols, said method comprising the steps of:
   computing a set of approximate combining weights in a first pass;
   identifying a set of soft pilot symbols in the sequence, wherein the soft pilot symbols are modulated with a lower order modulation than the remaining symbols in the sequence;
   utilizing the approximate combining weights to coherently combine despread values corresponding to the soft pilot symbols to create symbol estimates;
   making hard symbol decisions without decoder involvement on the symbol estimates given the constellation used for transmission;
   utilizing the hard symbol decisions as demodulation pilots to nonparametrically estimate an impairment covariance matrix;
   computing a set of refined combining weights in a second pass utilizing the estimated impairment covariance matrix; and
   combining all traffic data utilizing the refined combining weights.

2. A two-pass generalized Rake (G-Rake) receiver for processing a received radio signal that includes a sequence of transmitted symbols, said receiver comprising:
   means for computing a set of approximate combining weights in a first pass;
   means for identifying a set of soft pilot symbols in the sequence, wherein the soft pilot symbols are modulated with a lower order modulation than the remaining symbols in the sequence;
   means for utilizing the approximate combining weights to coherently combine despread values corresponding to the soft pilot symbols to create symbol estimates;
   means for making hard symbol decisions without decoder involvement on the symbol estimates given the constellation used for transmission;
   means for utilizing the hard symbol decisions as demodulation pilots to nonparametrically estimate an impairment covariance matrix;
   means for computing a set of refined combining weights in a second pass utilizing the estimated impairment covariance matrix; and
   means for combining all traffic data utilizing the refined combining weights.

* * * * *

UNITED STATES PATENT AND TRADEMARK OFFICE
CERTIFICATE OF CORRECTION

PATENT NO. : 8,149,929 B2  
APPLICATION NO. : 12/239918  
DATED : April 3, 2012  
INVENTOR(S) : Cairns et al.

Page 1 of 1

It is certified that error appears in the above-identified patent and that said Letters Patent is hereby corrected as shown below:

In Column 3, Line 7, delete "resealing" and insert -- rescaling --, therefor.

In Column 6, Line 67, delete " $V_{p,k}$ " and insert -- $V'_{p,k}$ --, therefor.

In Column 12, Line 15, delete "resealed" and insert -- rescaled --, therefor.

Signed and Sealed this  
Tenth Day of July, 2012

David J. Kappos  
*Director of the United States Patent and Trademark Office*